J. M. COLEMAN.
GRAIN CAR.
APPLICATION FILED JUNE 30, 1910.

998,325.

Patented July 18, 1911.

WITNESSES
Stuart W Allen
E. R. McKenzie

INVENTOR
James M Coleman
By Fred Falkenhayn
Atty

UNITED STATES PATENT OFFICE.

JAMES M. COLEMAN, OF MONTREAL, QUEBEC, CANADA.

GRAIN-CAR.

998,325.

Specification of Letters Patent. Patented July 18, 1911.

Application filed June 30, 1910. Serial No. 569,664.

*To all whom it may concern:*

Be it known that I, JAMES M. COLEMAN, of the city of Montreal, in the Province of Quebec and Dominion of Canada, have invented certain new and useful Improvements in Grain-Cars, of which the following is a full, clear, and exact description.

This invention relates to improvements in convertible cars, and the object is to provide a car which may be used in one form as a flat floored car for carrying miscellaneous freight, and may be quickly and easily converted into a hopper bottom car for carrying grain, coal or the like.

A further object is to provide a hopper bottom car which may be quickly and easily dumped into a small area, such as the chutes of a grain elevator.

A still further object is to provide means for preventing leakage of grain from the car during transit.

To accomplish these objects, I provide a car having the floor thereof formed in sections, covering permanent hoppers. When the car is used as a general purpose freight car, the floor remains level, but when used as a grain or coal car, the floor sections over the hoppers are raised to form the car into a hopper bottom car. The floor comprises two central sections divided longitudinally of the car and adapted to be raised at the sides to cover the doorways. An intermediate section at each end of the central sections is adapted to be raised at the ends of the car to form continuations of the hopper bottoms and a stationary section at each end of the car over the trucks. A suitable jamb plate is provided at the mouth of each hopper. A slidable door is arranged to open or close the hopper mouth and is adapted to fit into and be wedged against the jamb plate in closing to prevent any grain leakage during transit.

Figure 1:
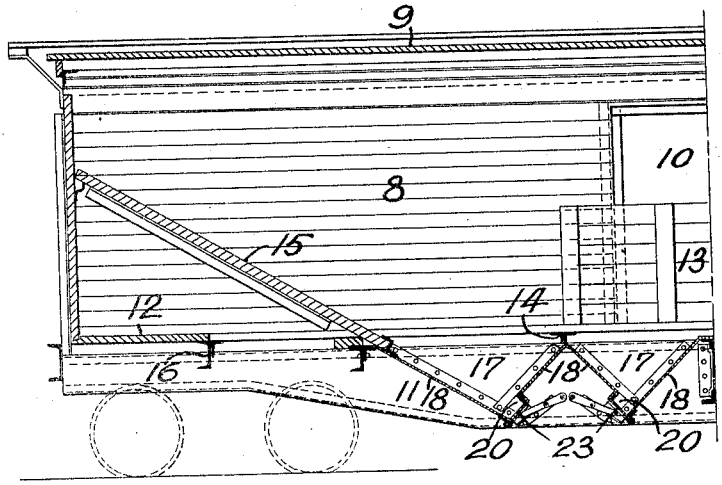
Figure 2:
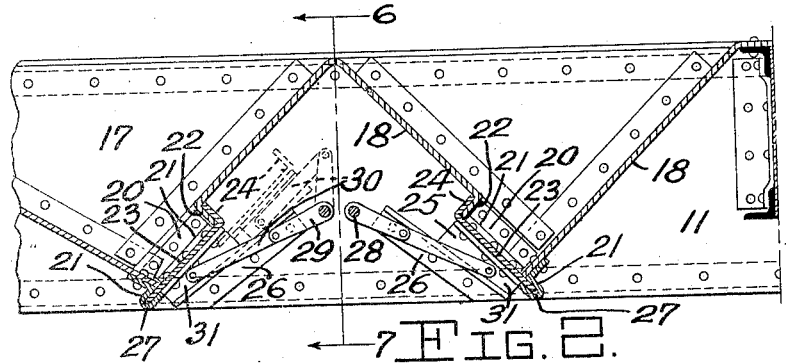
Figure 3:
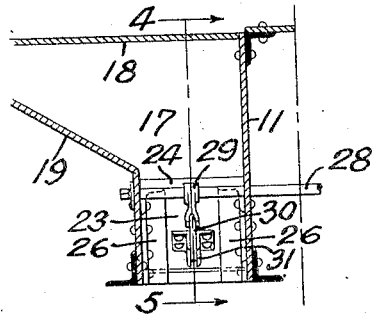

In the drawings which illustrate my invention:—Figure 1 is a half vertical longitudinal section of a car equipped with my gate. Fig. 2 is an enlarged view on the line 4—5 of Fig. 3, showing the gate in detail. Fig. 3 is a fragmentary vertical cross section on the line 6—7 of Fig. 2.

In the above defined figures, 8 designates the box or body of a car which is preferably made with the boards placed longitudinally inside the framework so as to present a perfectly smooth interior surface. This body is provided with a roof 9 and doorways 10. The body is mounted on longitudinal center sills 11. At each end of the car, the portion 12 of floor over the truck is stationary. The floor in the center of the car is formed of a pair of doors 13 which divide longitudinally at the center and are hinged at the sides of the car. These doors 13 extend well beyond the sides of the doorways and are supported at their ends on the transverse cross bearers 14. The floor at each end of the doors 13, between said doors and the stationary floor 12, is formed in a single intermediate section 15 extending the full width of the car. These intermediate sections 15 are supported at their inner ends on the same cross bearer 14 which supports the ends of the doors, and are supported at their outer ends on other transoms 16, which latter transoms also support the inner ends of the stationary floor sections 12.

Below the floor a plurality of stationary hoppers 17 are located on each side of the center sills. These hoppers are each composed of plates 18 sloping downwardly between the transoms. The inner sides of the hoppers are formed by the webs of the center sills and the outer sides are formed by plates 19 sloping downwardly from the sides of the car toward the center sills. At the bottom of each pair of hoppers, the adjacent plates 18 forming the same are apertured at 20 to form the mouth of the hopper.

The mouth 20 of the hopper is preferably rectangular as shown, and is provided on three sides with a jamb 21, the downturned edge 22 of the plate 18 forming the jamb on the top or fourth side. A sliding door or cover 23 is provided for the the mouth. This door is located externally of the hopper and is provided at the top with an inturned portion 24 adapted to overlap the edge 22 of the plate 18. The door is mounted on tapered runners 25 attached to the door with the small end at the lower edge of the door. The runners 25 travel on rails 26 fixed one to the center sill web and the other to the side plate 19 of the hopper, said rails diverging slightly from the plate 18 toward the upper end. The jamb plate 21 on the lower edge of the door is doubled over to form a recess for the lower edge of the door, as shown at 27. A shaft 28 passes transversely under the car and is provided on each side of the center sill with a lever 110

29. A link 30 is pivoted at one end to the free end of the lever and at the other end to a bracket 31 fixed to the door. The ends of the shafts may be squared to receive a suitable operating lever or wheel.

In operation as a grain car, the two floor doors 13 are raised to form an inner covering for the doorways 10, and the intermediate floor sections 15 are disposed as shown in Fig. 1, so that there is no level floor on which the grain will lodge. The car is filled in the usual way and despatched to its destination. To empty the car, the operator rotates the shafts 28 to shift the levers 27 and raise the doors on each side of the center sill, the door runners sliding on the rails 26 so that the door in rising also recedes from the jamb plate, as shown in dotted lines in Fig. 2. When the car is empty, or sufficient grain has escaped, the shaft 28 is rotated in the reverse direction so that the door returns to its original position and is wedged against the jamb plate by the tapered runners. The lower edge of the door enters the recess at 27, so that any leakage of grain is absolutely prevented. It will be readily seen from Fig. 2, that the door in closing will slide over the jamb, thus displacing any grain that would tend to obstruct the closing, or block the door open sufficiently to allow grain to leak out. It will also be seen that, whether in opening or closing, the door moves edgewise through the grain so that practically no resistance is offered to the movement. The doors may, obviously, be operated in any combination desired, and by any suitable mechanism other than that disclosed, without departing from the spirit of the invention.

Having thus described my invention, what I claim is:—

1. In a car of the class described, a plurality of hoppers located on each side of the center sill, a sliding door outside each hopper, a track for said door, means for reciprocating the door, and wedge shaped runners on the door engaging the track adapted to force the door into close contact with the hoppers.

2. In a car of the class described, a plurality of hoppers located on each side of the center sill, a sliding door at the bottom of each hopper, a track for said door, wedge shaped runners on the door engaging the track, and means for simultaneously raising said door and withdrawing the same from the hopper.

3. In a car of the class described, a plurality of hoppers having apertured ends, sliding doors adapted to close said end apertures, door jambs surrounding the end apertures, door runners angularly disposed to the door jambs, wedge shaped runners for the doors engaging said tracks for forcing the doors tightly against said jambs, and means for raising and lowering said doors.

4. In a car of the class described, a plurality of hoppers having apertured ends, sliding doors adapted to close said end apertures, tracks for said doors, wedge shaped runners on the doors engaging the tracks, transverse shafts, levers connected to said shafts, and links connecting the levers and doors.

5. In a car of the class described, a plurality of hoppers having end and bottom plates, said end plates being apertured to form hopper mouths and having outwardly turned flanges at the tops of said apertures, sliding doors adapted to close said apertures having inwardly turned flanges adapted to engage the end plate flanges, recessed jamb plates adapted to receive the door edges at the bottoms of said apertures, tracks for said doors, wedge shaped runners on the doors engaging the tracks, transverse shafts, levers connected to said shafts, and links connecting the levers and doors.

In witness whereof I have hereunto set my hand in the presence of two witnesses.

JAMES M. COLEMAN.

Witnesses:
 STUART R. W. ALLEN,
 E. R. McKENZIE.